(12) United States Patent
Lemberger et al.

(10) Patent No.: US 7,433,383 B2
(45) Date of Patent: Oct. 7, 2008

(54) TECHNIQUES TO DETECT RADAR IN A COMMUNICATION SIGNAL

(75) Inventors: Uriel Lemberger, Misagav (IL); Jorge Myszne, Zikhron Ya'akov (IL); Gal Basson, Haifa (IL)

(73) Assignee: Intel Corporation, Santa Clara, CA (US)

( * ) Notice: Subject to any disclaimer, the term of this patent is extended or adjusted under 35 U.S.C. 154(b) by 666 days.

(21) Appl. No.: 11/026,120

(22) Filed: Dec. 31, 2004

(65) Prior Publication Data

US 2006/0209972 A1   Sep. 21, 2006

(51) Int. Cl.
H04L 27/30  (2006.01)

(52) U.S. Cl. .................. 375/142; 375/150; 375/256; 375/343; 342/27

(58) Field of Classification Search ............. 375/130, 375/141, 142, 147, 150, 152, 256, 260, 340, 375/343; 342/27, 42, 57, 89, 90, 189
See application file for complete search history.

(56) References Cited

U.S. PATENT DOCUMENTS

| 6,999,025 | B2 * | 2/2006 | Poullin ................ 342/159 |
| 2003/0035465 | A1 * | 2/2003 | Takamura |
| 2005/0069021 | A1 * | 3/2005 | Lakkis |
| 2006/0140314 | A1 * | 6/2006 | Kim et al. |

* cited by examiner

Primary Examiner—Dac V Ha
(74) Attorney, Agent, or Firm—Kacvinsky LLC (57) ABSTRACT

Techniques to detect radar signals in a communication signal for a wireless system are described.

12 Claims, 4 Drawing Sheets

TECHNIQUES TO DETECT RADAR IN A COMMUNICATION SIGNAL

BACKGROUND

In a wireless communication system, wireless communication devices may transmit and/or receive information using radio frequency (RF) signals. Since RF spectrum may represent shared media, multiple devices may be transmitting using the same RF spectrum. Consequently, in some systems it may be desirable to detect the presence of other signals within a given set of RF signals. Accordingly, improvement in detection techniques may increase performance of a device or system.

DETAILED DESCRIPTION

Figure 1:
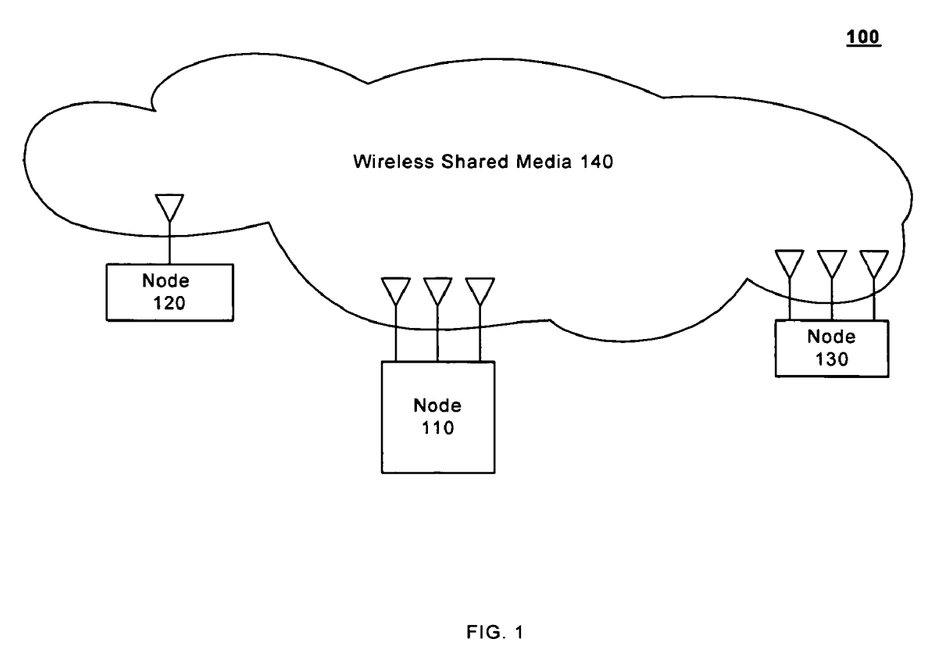
FIG. 1 illustrates a block diagram of a system 100.

FIG. 1 illustrates a block diagram of a system 100. System 100 may comprise, for example, a communication system having multiple nodes. A node may comprise any physical or logical entity having a unique address in system 100. Examples of a node may include, but are not necessarily limited to, a computer, server, workstation, laptop, ultra-laptop, handheld computer, telephone, cellular telephone, personal digital assistant (PDA), router, switch, bridge, hub, gateway, wireless access point, and so forth. The unique address may comprise, for example, a network address such as an Internet Protocol (IP) address, a device address such as a Media Access Control (MAC) address, and so forth. The embodiments are not limited in this context.

The nodes of system 100 may be arranged to communicate different types of information, such as media information and control information. Media information may refer to any data representing content meant for a user, such as voice information, video information, audio information, text information, alphanumeric symbols, graphics, images, and so forth. Control information may refer to any data representing commands, instructions or control words meant for an automated system. For example, control information may be used to route media information through a system, or instruct a node to process the media information in a predetermined manner.

The nodes of system 100 may communicate media and control information in accordance with one or more protocols. A protocol may comprise a set of predefined rules or instructions to control how the nodes communicate information between each other. The protocol may be defined by one or more protocol standards as promulgated by a standards organization, such as the Internet Engineering Task Force (IETF), International Telecommunications Union (ITU), the Institute of Electrical and Electronics Engineers (IEEE), and so forth. For example, system 100 may operate in accordance with the IEEE 802.11 wireless local area network (WLAN) series of standard protocols. The embodiments, however, are not limited in this context.

Referring again to FIG. 1, system 100 may comprise a wireless communication system. System 100 may include nodes 110, 120 and 130, all arranged to communicate information signals using wireless shared media 140. Information signals may include any type of signal encoded with information, such as media and/or control information. Although FIG. 1 is shown with a limited number of nodes in a certain topology, it may be appreciated that system 100 may include more or less nodes in any type of topology as desired for a given implementation. The embodiments are not limited in this context.

In one embodiment, for example, node 110 may comprise an access point (AP) 110. AP 110 may comprise a wireless access point for a network, such as a WLAN. AP 110 may be arranged to operate in accordance with the IEEE 802.11 series of protocols, such as IEEE 802.11a, 802.11b, 802.11g, 802.11h, 802.11n, and so forth. AP 110 may communicate media and control information to STA 120 and STA 130. AP 110 may also provide access to a network (not shown). The network may comprise, for example, a packet network such as the Internet, a voice network such as the Public Switched Telephone Network (PSTN), and so forth. In one embodiment, AP 110 may be implemented as a high throughput (HT) wireless device arranged to operate in accordance with the IEEE-802.11n proposed standard. In this case, AP 110 may include a MIMO system having multiple transmitters/receivers ("transceivers") and multiple antennas. The embodiments are not limited in this context.

In one embodiment, system 100 may comprise STA 120 and STA 130. STA 120 and 130 may each be implemented as, for example, a wireless communication device, such as mobile or cellular telephone, a computer or laptop equipped with a wireless access card, a handheld device such as a wireless PDA, an integrated cellular telephone/PDA, and so forth. The embodiments are not limited in this context.

In one embodiment, for example, STA 120 may be implemented as a device arranged to operate using a single transceiver. For example, STA 120 may be arranged to operate in accordance with the IEEE 802.11 series of standards, such as the IEEE 802.11a, 802.11b, 802.11g, 802.11h, and so forth. The embodiments are not limited in this context.

In one embodiment, for example, STA 130 may be implemented as a device arranged to operate using multiple transceivers. For example, STA 130 may also be arranged to operate in accordance with the IEEE 802.11 series of standards, such as the IEEE 802.11a, 802.11b, 802.11g, 802.11h, and so forth. In addition, STA 130 may be implemented as a HT wireless device arranged to operate in accordance with the IEEE-802.11n proposed standard. STA 130 may include a MIMO system having at least two transceivers and two antennas. The MIMO system, however, may have any number of transceivers and antennas, and the embodiments are not limited in this context.

In general operation, the nodes of system 100 may operate in multiple operating modes. For example, AP 110, STA 120 and STA 130 may operate in at least one of the following operating modes: a single-input-single-output (SISO) mode, a multiple-input-single-output (MISO) mode, a single-input-multiple-output (SIMO) mode, and/or in a MIMO mode. In a SISO operating mode, a single transmitter and a single receiver may be used to communicate information signals over a wireless shared medium 140. In a MISO operating mode, two or more transmitters may transmit information signals over wireless shared media 140, and information signals may be received from wireless shared media 140 by a single receiver of a MIMO system. In a SIMO operating mode, one transmitter and two or more receivers may be used to communicate information signals over wireless shared media. In a MIMO operating mode, two or more transmitters and two or more receivers may be used to communicate information signals over wireless shared media 140.

The various nodes of system 100 may be arranged to communicate information over wireless shared media 140. Wireless shared media 140 may comprise, for example, RF spectrum. The information may be communicated using in the form of packets, with each packet comprising media information and/or control information. The media and/or control information may be represented using, for example, multiple Orthogonal Frequency Division Multiplexing (OFDM) symbols. A packet in this context may refer to any discrete set of information, including a unit, frame, cell, segment, fragment, and so forth. The size of a packet may vary, and therefore may be of any size suitable for a given implementation. The embodiments are not limited in this context.

In one embodiment, one or more nodes of system 100 may operate in accordance with the IEEE standard titled "Information Technology—Telecommunications and Information Exchange Between Systems—Local and Metropolitan Networks—Specific Requirements—Part 11: Wireless LAN Medium Access Control (MAC) and Physical Layer (PHY) Specifications—Spectrum and Transmit Power Management Extensions in the 5 GHz Band in Europe," Oct. 13, 2003 ("IEEE 802.11h Standard"). The IEEE 802.11h Standard is supplementary to the MAC layer to comply with, for example, governmental regulations for 5 Giga-Hertz (GHz) WLAN. Governmental radio regulations for the 5 GHz band may require products to have transmission power control (TPC) and dynamic frequency selection (DFS). TPC may limit the transmitted power to the minimum needed to reach the furthest user. DFS may select the radio channel at the access point to minimize interference with other systems, particularly radar systems.

In accordance with the IEEE 802.11h Standard, DFS may require radar detection for all WLAN chipsets operating in the 5-6 GHz band. For example, assume AP 110 and STA 120 are arranged to operate in accordance with IEEE 802.11a. The IEEE 802.11h Standard defines techniques to ensure 802.11a wireless networks operate according to regulatory requirements for the 5 GHz spectrum. One such technique is DFS, which lets an access point and associated WLAN stations to dynamically switch to another channel to avoid interfering with radar, such as military radar. Consequently, AP 110 and/or STA 120 may need to detect radar signals within transmission range of AP 110 and/or STA 120, either before or during normal operations.

The IEEE 802.11h Standard may require the detection of a radar signal and the abandonment of the current channel if found. For example, assume AP 110 announces to STA 120 that spectrum management is required in the frames that advertise the existence of the WLAN. STA 120 may include the operational channels it supports in the frames sent to request an association with AP 110. AP 110 may respond with a message completing the operation to associate AP 110 and STA 120, including the current operating channels. If a radar signal is detected within the transmission area of wireless shared media 140, then AP 110 and STA 120 may need to switch from the current operating channels to a new channel. At this point, AP 110 may send a message to all associated WLAN stations, including STA 120, announcing that the WLAN segment will switch to a new channel, the time when the change will take place, and the new channel. At the designated time, STA 120 may switch its channel of operations to the new channel.

Conventional radar detection techniques, however, may not be satisfactory for a number of reasons. For example, conventional radar detection techniques may be limited to detecting radar signals in the time intervals between receiving 802.11 frames. As a result, there may be additional latency in the radar detection operation, thereby slowing down DFS operations. In another example, receiving devices may have difficulty discriminating between radar signals and other signals, such as 802.11 frames, noise, interference, and so forth. This may lead to false detections, thereby having AP 110 and STA 120 unnecessarily switching between channels.

Some embodiments may solve these and other problems. In one embodiment, for example, AP 110, STA 120 and/or STA 130 may include a radar detection module. The radar detection module may detect a radar signal within a communication signal. In one embodiment, for example, the communication signal may comprise an 802.11 communication signal representing information in the form of one or more OFDM symbols. A transceiver having a radar detection module suitable for use with system 100 may be described in more detail with reference to FIGS. 2-4.

Figure 2:
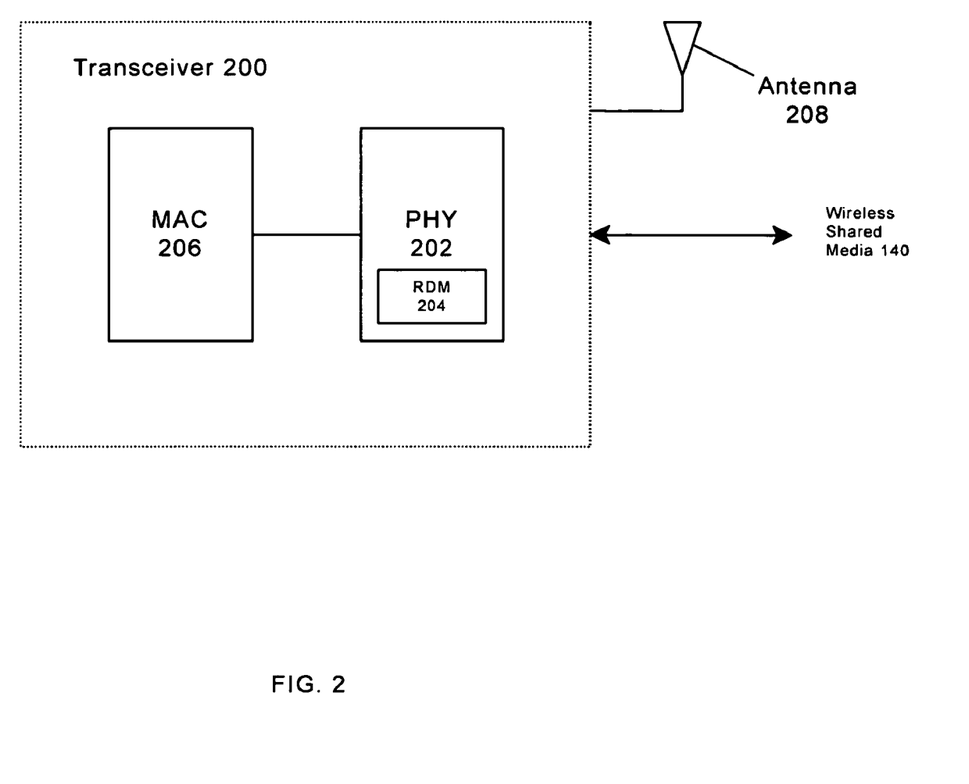
FIG. 2 illustrates a partial block diagram of a transceiver 200.

FIG. 2 illustrates a partial block diagram of a transceiver 200. Transceiver 200 may be implemented as part of AP 110, STA 120 and/or STA 130 as described with reference to FIG. 1. As shown in FIG. 2, transceiver 200 may comprise multiple elements, such as a physical layer (PHY) device 202, a MAC layer (MAC) device 206, and an antenna 208. Some elements may be implemented using, for example, one or more circuits, components, registers, processors, software subroutines, or any combination thereof. Although FIG. 2 shows a limited number of elements, it can be appreciated that more or less elements may be used in transceiver 200 as desired for a given implementation. The embodiments are not limited in this context.

In one embodiment, transceiver 200 may be implemented as an OFDM transmitter and receiver. Transceiver 200 may communicate frames of information with other wireless devices. For example, when implemented as part of AP 110, transceiver 200 may communicate frames with STA 120 and STA 130. When implemented as part of STA 120 and/or STA 130, transceiver 200 may communicate frames with AP 110. The frames may be modulated in accordance with a number of modulation schemes, to include Binary Phase Shift Keying (BPSK), Quadrature Phase-Shift Keying (QPSK), Quadrature Amplitude Modulation (QAM), 16-QAM, 64-QAM, and so forth. The embodiments are not limited in this context.

In one embodiment, transceiver 200 may be operably coupled to antenna 208. Examples for antenna 208 may include an internal antenna, an omni-directional antenna, a monopole antenna, a dipole antenna, an end fed antenna or a circularly polarized antenna, a micro-strip antenna, a diversity antenna, a dual antenna, an antenna array, and so forth. The embodiments are not limited in this context.

In one embodiment, node 200 may include MAC 206. MAC 206 may perform MAC layer operations for transceiver 200. MAC 206 may be implemented using, for example, a MAC processor. MAC processor 206 may comprise a general purpose processor, such as a processor made by Intel® Corporation, for example. MAC processor 206 may also comprise a dedicated processor, such as a controller, microcontroller, embedded processor, a digital signal processor (DSP), a network processor, an input/output (I/O) processor, and so forth. The embodiments are not limited in this context.

In one embodiment, MAC processor 206 may include, or be connected to, a memory unit (not shown). The memory unit may comprise any machine-readable media. Some examples of machine-readable media include, but are not necessarily limited to, read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, a polymer memory such as ferroelectric polymer memory, an ovonic memory, a phase change or ferroelectric memory, a silicon-oxide-nitride-oxide-silicon (SONOS) memory, and so forth. The embodiments are not limited in this context.

In one embodiment, transceiver 200 may include PHY 202. PHY 202 may perform PHY layer operations for transceiver 200, such as performing carrier sensing, transmitting and receiving 802.11 frames, and so forth. The embodiments are not limited in this context.

In one embodiment, PHY 202 may include a radar detection module (RDM) 204. RDM 204 may detect a radar signal within an 802.11 communication signal comprising multiple OFDM symbols. The radar signal may comprise any type of radar signal, such as a narrow band radar signal, for example. RDM 204 may use various auto-correlation techniques to detect the radar signal within the communication signal. Auto-correlation may refer to defining how much a function or signal correlates with a time shifted version of itself, with respect to that time shift. RDM 204 may use auto-correlation to detect radar signals even when other signals are present, such as 802.11 frames comprising OFDM symbols, noise, and so forth. Although RDM 204 may be shown as part of PHY 202, it may be appreciated that RDM 204 may be implemented in any part of a node and/or transceiver 200. The embodiments are not limited in this context.

Figure 3:
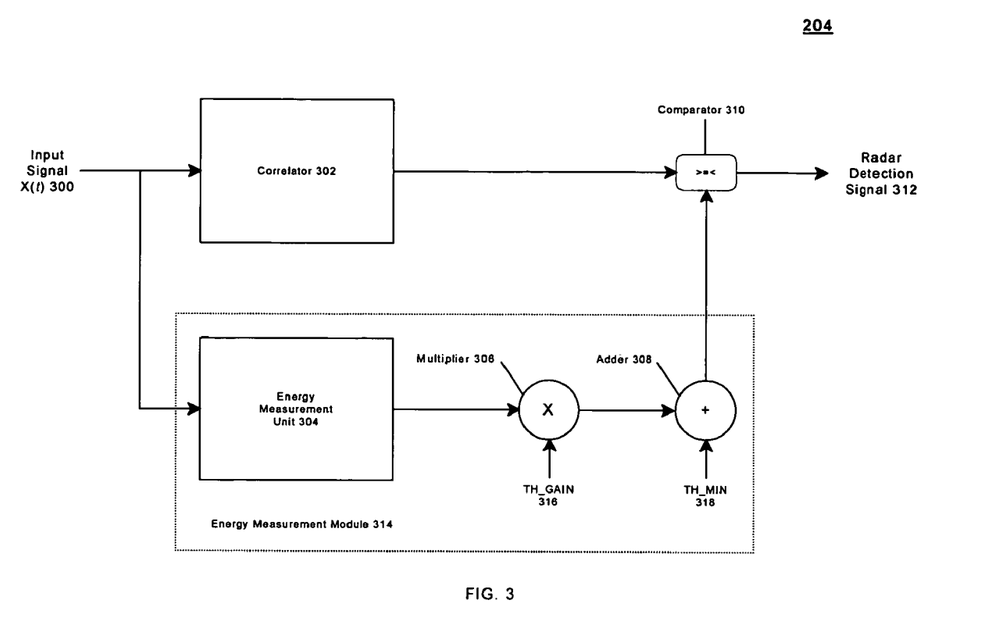
FIG. 3 illustrates a block diagram of a radar detection module 204.

FIG. 3 illustrates RDM 204. As shown in FIG. 3, RDM 204 may comprise multiple elements, such as a correlator 302, an energy measurement module 314, and an element 310. Some elements may be implemented using, for example, one or more circuits, components, registers, processors, software subroutines, or any combination thereof. Although FIG. 3 shows a limited number of elements, it can be appreciated that more or less elements may be used in RDM 204 as desired for a given implementation. The embodiments are not limited in this context.

In one embodiment, RDM 204 may include correlator 302. Correlator 302 may perform auto-correlation to detect radar signals, both when other signals are present or not present. Correlator 302 may receive a communication signal and output a correlated signal. For example, the communication signal may be represented by input signal X(t) 300. Input signal X(t) 300 may comprise a signal received from wireless shared media 140 via transceiver 200. Since wireless shared media 140 may be used by more than one device or system, input signal X(t) 300 may comprise a combination of various signals, such as an OFDM signal, a radar signal, noise, and so forth. Correlator 302 may perform auto-correlation and generate a correlated signal. The correlated signal may be used to detect if a radar signal is present within input signal X(t) 300.

In one embodiment, RDM 204 may be arranged to detect radar signals, such as narrow band radar signals. The radar signals may comprise continuous wave or chirp signals. The pulse width for the radar signals may vary. For example, a typical pulse width for a radar signal may be in the range of 1-20 micro-seconds (μs) or more. The embodiments are not limited in this context.

In one embodiment, assume a typical pulse width of 20 μs by way of example. Given this typical pulse width, correlator 302 may use a time period of 0.5 μs (e.g., T=0.5 μs) to perform the auto-correlation of input signal X(t) 300 in accordance with Equation (1) as follows:

$$\text{autocorrelation} = |\int x(t) \cdot x^*(t-T) dt| \text{ energy\_meas} = \int ||x(t)|| dt \quad \text{Equation (1)}$$

The radar frequency is typically unknown and has no relationship with the WLAN center frequency, so the radar signal can present a relatively large frequency offset as seen by the WLAN chipset. For example, the frequency offset may comprise up to 10 Mega-Hertz (MHz). Auto-correlation of continuous wave signals, however, may not be sensitive to the frequency offset, as can be seen from Equation (2) as follows:

$$x(t) = Ae^{jw0t} \text{autocorrelation} = |\int Ae^{jw0t} \cdot A^* e^{-jw0(t-T)} dt| = |\int A^2 e^{j(w0t - w0(t-T))} dt| = A^2 |\int e^{j(w0T)} dt| = NA^2 \quad \text{Equation (2)}$$

An OFDM signal typically has no periodicity over 0.5 μs, and therefore it will respond as white noise to correlator 302. Given this information, and normalizing by the overall energy, RDM 204 may detect a radar signal, even in presence of an OFDM signal.

It is worthy to note that correlator 302 may use a time period other than 0.5 μs (e.g., T=0.5 μs) to perform the auto-correlation of input signal X(t) 300. The time period of T=0.5 μs may comprise one example since it is a time period suitable for use with 1 μs. Alternatively, other time periods may work with pulse widths narrower than 1 μs, thereby resulting in a delay that is smaller than 0.5 μs. The embodiments are not limited in this context.

In one embodiment, RDM 204 may include energy measurement module 314. Energy measurement module 314 may receive a communication signal, such as input signal X(t) 300, for example. Energy management module 314 may output an energy measurement signal to comparator 310.

In one embodiment, energy management module 314 may comprise, for example, an energy measurement unit 304, an element 306, and an element 308. Although energy measurement module 314 is shown with a limited number of elements, it can be appreciated that more or less elements may be used in energy measurement module 314 as desired for a given implementation. For example, elements 306 and 308 may be implemented separate from energy management module 314 and still fall within the intended scope of the embodiments. The embodiments are not limited in this context.

In one embodiment, energy measurement module 314 may include energy measurement unit 304. Energy measurement unit 304 may receive input signal X(t) 300. Energy measurement unit 304 may measure an energy level for input signal X(t) 300, as represented by energy_meas illustrated in Equation (1). Energy measurement unit 304 may output a first stage energy measurement signal to element 306.

In one embodiment, energy measurement module 314 may include element 306. Element 306 may comprise, for example, a multiplier. Multiplier 306 may receive as a first input the first stage energy measurement signal from energy measurement unit 304. In addition, multiplier 306 may receive as a second input an energy normalization signal, as represented by TH_GAIN signal 316. TH_GAIN signal 316 may represent a threshold value used for energy normalization. The value of TH_GAIN signal 316 may comprise a constant value determined when calibrating the system, or a variable value. Multiplier 306 may normalize the first stage energy measurement signal using TH_GAIN signal 316. Multiplier 306 may output the normalized first stage energy measurement signal as a second stage energy measurement signal to element 308.

In one embodiment, energy measurement module 314 may include element 308. Element 308 may comprise, for example, an adder. Adder 308 may receive as a first input the second stage energy measurement signal from multiplier 306. In addition, adder 308 may receive as a second input an energy shift signal, as represented by TH_MIN signal 318.

TH_MIN signal 318 may represent a minimum desired level for the radar signal being detected. The value of TH_MIN signal 318 may comprise a constant value determined when calibrating the system, or a variable value. Adder 308 may combine the second stage energy measurement signal with TH_MIN signal 318. Adder 308 may output the energy measurement signal to comparator 310.

It is worthy to note that although elements 306 and 308 are shown as part of energy measurement module 314, it may be appreciated that these elements may be implemented in any part of transceiver 200. In one embodiment, for example, elements 306 and 308 may be implemented as part of correlator 302 rather than energy measurement module 314. The embodiments are not limited in this context.

In one embodiment, RDM 204 may include element 310. Element 310 may comprise, for example, a comparator. Comparator 310 may receive as a first input the correlated signal from correlator 302. Comparator 310 may receive as a second input the energy measurement signal from adder 308. Comparator 310 may compare the correlated signal with the energy measurement signal. Comparator 310 may output a radar detection signal in accordance with the comparison. The radar detection signal may be used to determine whether input signal X(t) 300 includes a radar signal.

In one embodiment, comparator 310 may operate as a subtractor, and subtract the energy measurement signal from the correlated signal. If the value of the radar detection signal is above a certain defined threshold value, a determination may be made that input signal X(t) 300 includes a radar signal. This may be because auto-correlation of a continuous wave, such as a continuous wave radar signal, typically has a high degree of correlation. Therefore, the threshold value may be set to recognize a higher degree of correlation. If the value of the radar detection signal is below the threshold value, however, a determination may be made that input signal X(t) 300 does not include a radar signal. This may be because auto-correlation of a random signal, such as an OFDM signal or noise, typically has a low degree of correlation. Therefore, if the radar detection signal is below the threshold value, there is a high probability that input signal X(t) may comprise an OFDM signal and/or noise. In this manner, auto-correlation may be used to detect a radar signal, even when the radar signal may be a component of other signals, such as an OFDM signal or noise.

By way of example, assume input signal X(t) 300 as received by transceiver 200 does include a radar signal. Further assume that the threshold value for the radar detection signal is approximately 0.8, the correlated signal of input signal X(t) 300 is approximately 0.9, the energy level of input signal X(t) 300 is approximately 1.0, TH_GAIN signal 316 is set to 0.8, and TH_MIN signal 318 is set to 0.0. The energy measurement signal output from adder 308 to comparator 310 may have a value of approximately 0.8 (e.g., 1.0*0.8+0.0=0.8). Comparator 310 may receive the correlated signal from correlator 302 with a value of approximately 0.9. Comparator 310 may compare the correlated signal and the energy measurement signal, and output a radar detection signal indicating that the correlated signal is higher than the energy measurement signal (e.g., 0.9>0.8), thereby indicating the presence of a radar signal within input signal X(t) 300.

In another example, assume input signal X(t) 300 as received by transceiver 200 does not include a radar signal. Further assume that the threshold value for the radar detection signal is approximately 0.8, the correlated signal of input signal X(t) 300 is approximately 0.5, the energy level of input signal X(t) 300 is approximately 1.0, TH_GAIN signal 316 is set to 0.8, and TH_MIN signal 318 is set to 0.0. The energy measurement signal output from adder 308 to comparator 310 may have a value of approximately 0.8 (e.g., 1.0*0.8+0.0=0.8). Comparator 310 may receive the correlated signal from correlator 302 with a value of approximately 0.5. Comparator 310 may compare the correlated signal and the energy measurement signal, and output a radar detection signal indicating that the correlated signal is lower than the energy measurement signal (e.g., 0.5<0.8). Since the radar detection value indicates that the correlated signal is lower than the energy measurement signal, RDM 204 may assume that input signal X(t) 300 does not include a radar signal.

It is worthy to note that the values used in the above examples are provided by way of example only, and are not meant to limit the scope of the embodiments. RDM 204 may be arranged to operate with any number of values appropriate for a given implementation. The embodiments are not limited in this context.

Operations for the above embodiments may be further described with reference to the following figures and accompanying examples. Some of the figures may include programming logic. Although such figures presented herein may include a particular programming logic, it can be appreciated that the programming logic merely provides an example of how the general functionality described herein can be implemented. Further, the given programming logic does not necessarily have to be executed in the order presented unless otherwise indicated. In addition, the given programming logic may be implemented by a hardware element, a software element executed by a processor, or any combination thereof. The embodiments are not limited in this context.

Figure 4:
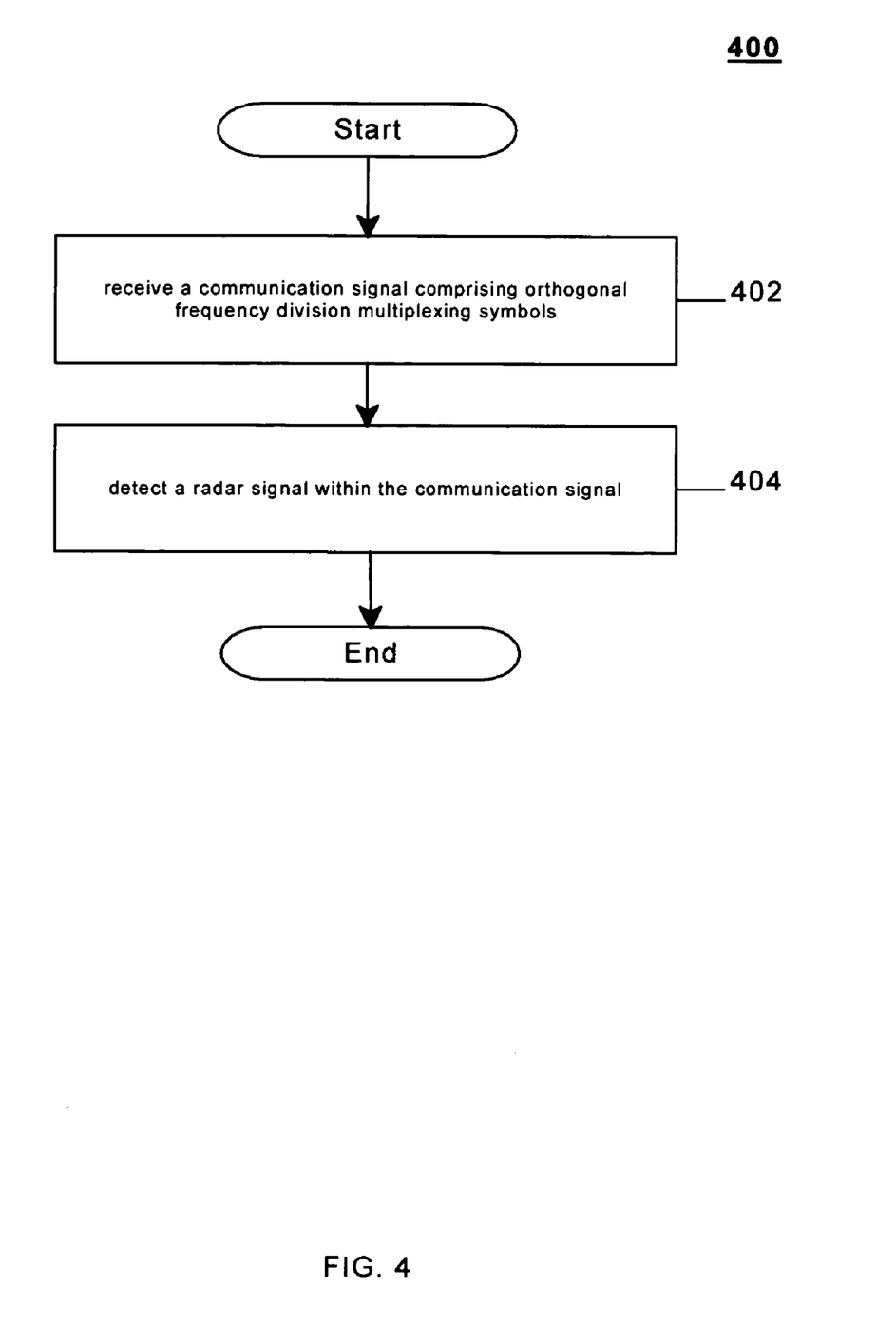
FIG. 4 illustrates a programming logic 400.

FIG. 4 illustrates a programming logic 400. Programming logic 400 may be representative of the operations executed by one or more systems described herein, such as RDM 204 as implemented as part of transceiver 200, for example. As shown in programming logic 400, a communication signal comprising one or more OFDM symbols may be received at block 402. A radar signal may be detected within the communication signal at block 404.

In one embodiment, the detection may be performed by, for example, using one or more auto-correlation techniques. For example, the communication signal may be auto-correlated to form a correlated signal. The communication signal may be measured to form an energy measurement signal. The correlated signal may be compared to the energy measurement signal to form a radar detection signal.

In one embodiment, the auto-correlation may be performed using a time period of approximately 0.5 microseconds to form the correlated signal. This may be a useful selection for a time period given that the typical pulse width of a continuous wave radar signal is 1-20 µs or more. Other time periods, however, may also be used in accordance with a given implementation, such as when being used to detect radar signals having a different pulse width. The embodiments are not limited in this context.

In one embodiment, an energy level for the communication signal may be measured to form a first state energy measurement signal. The first stage energy measurement signal and an energy normalization signal may be multiplied to form a second stage energy measurement signal. The second stage energy measurement signal and an energy shift signal may be added to form the energy measurement signal. The correlated signal may be compared to the energy measurement signal to form a radar detection signal. The radar detection signal may be used to detect the presence of a radar signal within the communication signal.

It should be understood that the embodiments may be used in a variety of applications. As described above, the circuits and techniques disclosed herein may be used in many apparatuses such as transmitters and receivers of a radio system. Transmitters and/or receivers intended to be included within the scope of the embodiments may include, by way of example only, WLAN transmitters and/or receivers, MIMO transmitters-receivers system, two-way radio transmitters and/or receivers, digital system transmitters and/or receivers, analog system transmitters and/or receivers, cellular radiotelephone transmitters and/or receivers, and so forth. The embodiments are not limited in this context.

Types of WLAN transmitters and/or receivers intended to be within the scope of the embodiments may include, although are not limited to, transmitters and/or receivers for transmitting and/or receiving spread spectrum signals such as, for example, Frequency Hopping Spread Spectrum (FHSS), Direct Sequence Spread Spectrum (DSSS) OFDM transmitters and/or receivers, and so forth. The embodiments are not limited in this context.

Numerous specific details have been set forth herein to provide a thorough understanding of the embodiments. It will be understood by those skilled in the art, however, that the embodiments may be practiced without these specific details. In other instances, well-known operations, components and circuits have not been described in detail so as not to obscure the embodiments. It can be appreciated that the specific structural and functional details disclosed herein may be representative and do not necessarily limit the scope of the embodiments.

It is also worthy to note that any reference to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

Some embodiments may be implemented using an architecture that may vary in accordance with any number of factors, such as desired computational rate, power levels, heat tolerances, processing cycle budget, input data rates, output data rates, memory resources, data bus speeds and other performance constraints. For example, an embodiment may be implemented using software executed by a general-purpose or special-purpose processor. In another example, an embodiment may be implemented as dedicated hardware, such as a circuit, an application specific integrated circuit (ASIC), Programmable Logic Device (PLD) or digital signal processor (DSP), and so forth. In yet another example, an embodiment may be implemented by any combination of programmed general-purpose computer components and custom hardware components. The embodiments are not limited in this context.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, various types of Digital Versatile Disk (DVD), a tape, a cassette, or the like. The instructions may include any suitable type of code, such as source code, compiled code, interpreted code, executable code, static code, dynamic code, and the like. The instructions may be implemented using any suitable high-level, low-level, object-oriented, visual, compiled and/or interpreted programming language, such as C, C++, Java, BASIC, Perl, Matlab, Pascal, Visual BASIC, assembly language, machine code, and so forth. The embodiments are not limited in this context.

While certain features of the embodiments have been illustrated as described herein, many modifications, substitutions, changes and equivalents will now occur to those skilled in the art. It is therefore to be understood that the appended claims are intended to cover all such modifications and changes as fall within the true spirit of the embodiments.

The invention claimed is:

1. An apparatus to detect a radar signal, comprising:
a correlator to receive a communication signal comprising orthogonal frequency division multiplexing symbols and output a correlated signal;
an energy measurement module to receive said communication signal and output an energy measurement signal; and
a comparator to receive said correlated signal and said energy measurement signal, said comparator to output a radar detection signal.

2. The apparatus of claim 1, wherein said correlator uses a time period of approximately 0.5 microseconds to generate said correlated signal.

3. The apparatus of claim 1, said energy measurement module to comprise:
an energy measurement unit to receive said communication signal and output a first stage energy measurement signal;
a multiplier to receive said first stage energy measurement signal and an energy normalization signal, said multiplier to output a second stage energy measurement signal; and
an adder to receive said second stage energy measurement signal and an energy shift signal, said adder to output said energy measurement signal.

4. A system, comprising:
an access point to send a communication signal having orthogonal frequency division multiplexing symbols; and
a station having an antenna and a receiver, said receiver to receive said communication signal using said antenna, said receiver including a radar detection module to detect a radar signal within said communication signal, said radar detection module including:

a correlator to receive said communication signal and output a correlated signal;

an energy measurement module to receive said communication signal and output an energy measurement signal; and a comparator to receive said correlated signal and said energy measurement signal, said comparator to output a radar detection signal.

5. The system of claim 4, wherein said correlator uses a time period of approximately 0.5 microseconds to generate said correlated signal.

6. The system of claim 4, said energy measurement module to comprise:

an energy measurement unit to receive said communication signal and output a first stage energy measurement signal;

a multiplier to receive said first stage energy measurement signal and an energy normalization signal, said multiplier to output a second stage energy measurement signal; and an adder to receive said second stage energy measurement signal and an energy shift signal, said adder to output said energy measurement signal.

7. A method comprising:

receiving a communication signal comprising orthogonal frequency division multiplexing symbols;

detecting a radar signal within said communication signal;

correlating said communication signal to form a correlated signal;

measuring said communication signal to form an energy measurement signal; and comparing said correlated signal and said energy measurement signal to form a radar detection signal.

8. The method of claim 7, wherein said correlating uses a time period of approximately 0.5 microseconds to form said correlated signal.

9. The method of claim 7, further comprising:

measuring said communication signal to form a first state energy measurement signal;

multiplying said first stage energy measurement signal and an energy normalization signal to form a second stage energy measurement signal; and adding said second stage energy measurement signal and an energy shift signal to form said energy measurement signal.

10. An article comprising a computer-readable storage medium including stored instructions that when executed by a processor enable the processor to receive a communication signal comprising orthogonal frequency division multiplexing symbols, detect a radar signal within said communication signal, correlate said communication signal to form a correlated signal, measure said communication signal to form an energy measurement signal, and compare said correlated signal and said energy measurement signal to form a radar detection signal.

11. The article of claim 10, wherein the stored instructions, when executed by a processor, further correlate using a time period of approximately 0.5 microseconds to form said correlated signal.

12. The article of claim 10, wherein the stored instructions, when executed by a processor, further measure said communication signal to form a first state energy measurement signal, multiply said first stage energy measurement signal and an energy normalization signal to form a second stage energy measurement signal, and add said second stage energy measurement signal and an energy shift signal to form said energy measurement signal.

* * * * *

UNITED STATES PATENT AND TRADEMARK OFFICE
CERTIFICATE OF CORRECTION

PATENT NO. : 7,433,383 B2  Page 1 of 1
APPLICATION NO. : 11/026120
DATED : October 7, 2008
INVENTOR(S) : Lemberger et al.

It is certified that error appears in the above-identified patent and that said Letters Patent is hereby corrected as shown below:

In column 11, line 25, in Claim 7, after "method" insert -- , --.

In column 12, line 5, in Claim 9, delete "state" and insert -- stage --, therefor.

In column 12, line 29, in Claim 12, delete "state" and insert -- stage --, therefor.

Signed and Sealed this

Thirty-first Day of March, 2009

JOHN DOLL
*Acting Director of the United States Patent and Trademark Office*